(12) United States Patent
Nikitin et al.

(10) Patent No.: US 7,724,142 B2
(45) Date of Patent: May 25, 2010

(54) SYSTEMS AND METHODS FOR WIRELESSLY MARKING MEDIA

(75) Inventors: Pavel Nikitin, Seattle, WA (US); Venkata Kodukula, Bothell, WA (US); For Sander Lam, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 419 days.

(21) Appl. No.: 11/862,950

(22) Filed: Sep. 27, 2007

(65) Prior Publication Data

US 2009/0085749 A1  Apr. 2, 2009

(51) Int. Cl.
*G08B 13/14* (2006.01)

(52) U.S. Cl. .............. 340/572.7; 340/572.1; 340/10.1; 340/572.8

(58) Field of Classification Search .............. 340/572.1, 340/572.7, 572.8, 10.1; 235/375, 385
See application file for complete search history.

(56) References Cited

U.S. PATENT DOCUMENTS

| 5,689,238 | A  | * | 11/1997 | Cannon et al. | ........... 340/572.1 |
| 6,342,830 | B1 | * | 1/2002  | Want et al.   | ................ 340/10.1 |
| 7,129,840 | B2 | * | 10/2006 | Hull et al.   | ................ 340/568.1 |
| 7,280,044 | B2 | * | 10/2007 | Kubby         | ....................... 340/572.7 |
| 7,357,300 | B2 | * | 4/2008  | Hull et al.   | ................ 340/572.1 |
| 2003/0214388 | A1 | * | 11/2003 | Stuart et al. | ................ 340/10.1 |
| 2006/0097510 | A1 | * | 5/2006  | Sharpe        | ......................... 283/36 |
| 2006/0176179 | A1 | * | 8/2006  | Skorpik et al. | ........... 340/572.8 |
| 2006/0238344 | A1 |   | 10/2006 | Kubby         | |
| 2006/0265332 | A1 | * | 11/2006 | Goffinet et al. | ............... 705/56 |
| 2007/0209264 | A1 | * | 9/2007  | Lau           | ............................ 40/641 |

FOREIGN PATENT DOCUMENTS

WO    9960829 A2    11/1999

OTHER PUBLICATIONS

"History of the Paper Clip," Early Office Museum, retrieved Jul. 24, 2008, http://www.officemuseum.com/paper_clips.htm.
"New Memory Spot chip from HP," Mobile Tech News, retrieved Jul. 24, 2008, http://www.mobiletechnews.com/info/2006/07/17/110000.html.

* cited by examiner

*Primary Examiner*—Eric M Blount
(74) *Attorney, Agent, or Firm*—Seed IP Law Group PLLC

(57) ABSTRACT

A media marking transponder system includes a media fastener and a wireless transponder circuit coupled to the media fastener. The antenna for the wireless transponder circuit has a first effective length when no piece of media is fastened to the media fastener and a second, different effective length when at least one piece of media is fastened to the media fastener.

25 Claims, 6 Drawing Sheets

SYSTEMS AND METHODS FOR WIRELESSLY MARKING MEDIA

BACKGROUND

1. Technical Field

This description generally relates to the field of wireless identification, and more particularly to wirelessly marking media.

2. Description of the Related Art

Wireless communication devices, including wireless memory devices for storing and retrieving data, such as radio frequency identification ("RFID") tags, are used in a variety of environments. Such devices typically employ an antenna structure coupled to a wireless transponder circuit to transmit and/or receive data via electromagnetic signals in some frequency range.

Antenna structures may include a primary antenna element driven by a transmitter to transmit data in an outgoing signal and/or driven by an external signal from an external source to receive incoming data. Antenna structures may further include parasitic antenna elements that electromagnetically cooperate with the driven antenna element to enhance the transmission or reception of a signal. Parasitic antenna elements may be chosen from a variety of directors and reflectors, the directors being generally shorter and the reflectors being generally longer than the driven antenna element. The parasitic antenna elements are normally aligned with and are carefully spaced from the driven antenna element and one another.

The wireless transponder circuit found in many wireless memory devices typically includes a memory portion and a logic portion. The memory portion stores data, while the logic portion controls the reading, writing, and manipulating of data in the memory portion. The logic portion may further couple between the memory portion and the antenna to act as a transmitter, receiver, or transceiver for reading and/or writing data to and/or from the wireless memory device.

Active wireless memory devices include a discrete consumable power source, such as a battery, to provide power to the wireless transponder circuit. In contrast, passive wireless memory devices derive power from a wireless interrogation signal, for example, by backscattering the signal as a response signal encoded with information from the wireless memory device. Wireless memory device may be associated with a variety of sensors to measure environmental conditions, such as current or maximum values of pressure, temperature, acceleration, etc.

Wireless marking may be used in a variety of fields to track a high volume of items. For example, in an office environment, it may be desirable to use wireless communication devices to track the large number of documents generated.

BRIEF SUMMARY

In one embodiment, a media marking transponder system comprises: a media fastener; a wireless transponder circuit coupled to the media fastener; and an antenna for the wireless transponder circuit, the antenna having a first effective length when no piece of media is fastened to the media fastener and a second effective length when at least one piece of media is fastened to the media fastener, the second effective length different than the first effective length.

The wireless transponder circuit may be a radio frequency identification circuit, in one embodiment, and may further be a passive radio frequency identification circuit.

In another embodiment, a media marking transponder system comprises: means for fastening to at least one piece of media; means for responding to a wireless interrogation signal, the means for responding physically coupled to the means for fastening; and means for wirelessly transmitting a signal produced by the means for responding, the means for wirelessly transmitting having a first effective length when no piece of media is fastened to the means for fastening and a second effective length when at least one piece of media is fastened to the means for fastening, the second effective length different than the first effective length.

In one embodiment, the means for fastening may comprise the means for wirelessly transmitting, and, in another embodiment, the means for wirelessly transmitting may be carried by the at least one piece of media.

In yet another embodiment, a method of marking media comprises: providing a wireless transponder circuit and an antenna for the wireless transponder circuit; changing an effective length of the antenna at least in part by coupling the wireless transponder circuit to at least one piece of media; and receiving a signal produced by the wireless transponder circuit via the antenna having the changed effective length.

In one embodiment, the antenna may be physically coupled to the wireless transponder circuit, and coupling the wireless transponder circuit to the at least one piece of media may include fastening the antenna to the at least one piece of media.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF EMBODIMENTS OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with integrated circuits, antennas, radio frequency transmitters and receivers, and machine readable symbologies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of an Exemplary Media Marking Transponder System

Figure 1:
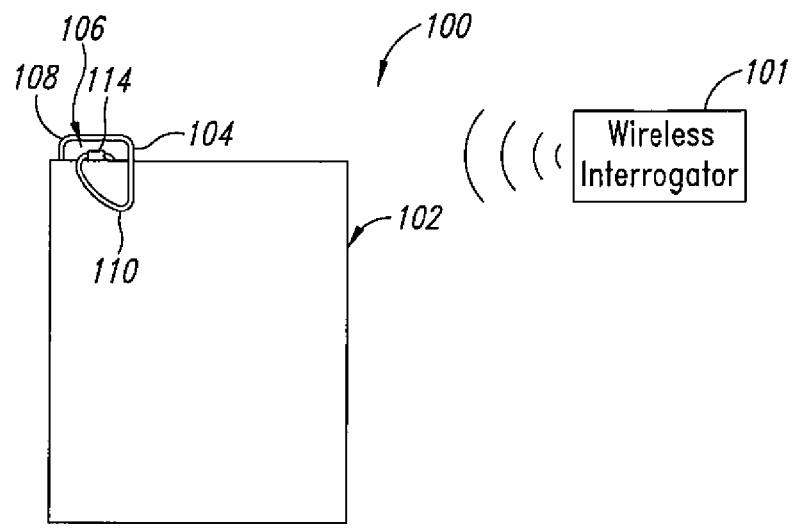
FIG. 1 is a top view of a media marking transponder system, including a media fastener fastened to at least one piece of media, according to one illustrated embodiment.

FIG. 1 shows a media marking transponder system 100, including a media fastener 104 fastened to at least one piece of media 102. The at least one piece of media 102 may comprise a number of sheets of paper representing one or more documents. In other embodiments, however, the pieces of media fastened by the media marking transponder system may comprise any other form of media, such as MYLAR, Vellium, cardboard, folders, binders, computer-readable diskettes, CDs, DVDs, etc.

Figure 2:
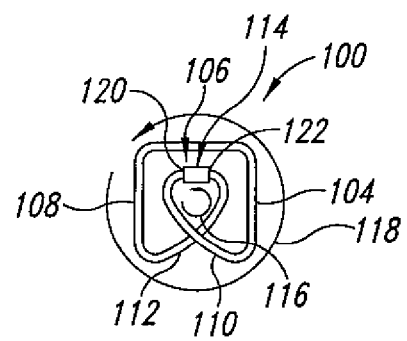
FIG. 2 is a top view of the media marking transponder system of FIG. 1, the media fastener not fastened to any media.

As shown in FIGS. 1 and 2, the media marking transponder system 100 may include a media fastener 104, a wireless transponder circuit 106 physically coupled to the media fastener 104, and an antenna 108 for the wireless transponder circuit 106.

The media marking transponder system 100 may further include a wireless interrogator 101, and, when fastened to the media 102, the wireless transponder circuit 106 may exchange wireless signals with the wireless interrogator 101. In one embodiment, the wireless interrogator 101 may be configured to emit wireless interrogation signals in a frequency range in which the wireless transponder circuit 106 operates. In some embodiments, interrogation signals emitted by the wireless interrogator 101 and response signals emitted by the wireless transponder circuit 106 may be at a same or similar frequency. In other embodiments, the response signals may be at a different frequency than the interrogation signals.

In one embodiment, the media fastener 104 may selectively fasten to the media 102. Among other configurations, the media fastener 104 may be shaped and constructed similarly to a paperclip. The media fastener 104 may be formed from a metal, or a conducting non-metal, which is capable of being elastically deformed and which is resilient. As illustrated, a conductive surface of the media fastener 104 may remain exposed, such that when portions of the media fastener 104 contact one another, an electrical connection may be formed. In other embodiments, other media fastener configurations may be used. For example, the media fastener may be configured similarly to a binder clip, a staple, a tack, etc.

The media fastener 104 may further comprise a first media engagement portion 110 and a second media engagement portion 112 between which the media 102 is selectively fastenable. In a relaxed configuration, with no media fastened between the media engagement portions 110, 112, as illustrated in FIG. 2, the media engagement portions 110, 112 are in physical and electrical contact with one another. However, when the media engagement portions 110, 112 are elastically deformed, for example, in order to fasten the media 102, as illustrated in FIG. 1 the media engagement portions 110, 112 are electrically insulated from each other by the media 102.

The wireless transponder circuit 106 may include a housing 114 surrounding its internal circuitry, as illustrated. The housing 114 may protect the internal circuitry of the wireless transponder circuit 106 from environmental effects; although, in other embodiments, the media marking transponder system 100 may lack such a housing.

The wireless transponder circuit 106 may be electrically coupled to the antenna 108 and include circuitry for providing and receiving modulated signals. In one embodiment, the wireless transponder circuit 106 is a radio frequency identification (RFID) circuit, and may operate over a range of frequencies, such as 860-930 MHz, 2.45 GHz, or 5.8 GHz. This range of operating frequencies may be chosen to match an operating frequency of the wireless interrogator 101. In other embodiments, the wireless transponder circuit 106 may otherwise provide structures for responding to a wireless interrogation signal from the wireless interrogator 101.

In one embodiment, the wireless transponder circuit 106 is a passive RFID circuit lacking a discrete power source, such as a battery. By relying upon inductive powering, a passive RFID circuit may be made smaller than an "active" RFID circuit that includes a discrete power source and may have a longer operational life. In the passive embodiment, the wireless transponder circuit 106 may further include power circuitry for generating power from an electromagnetic field. Of course, active RFID circuitry may be used in other embodiments, for example, to increase the range of the media marking transponder system 100.

The wireless transponder circuit 106 may further comprise a read/write passive RFID circuit having a memory for storing electronic data. The memory may be in the form of memory circuits, and the wireless transponder circuit 106 may further comprise logic circuits for storing, retrieving, and manipulating data in the memory. The wireless transponder circuit 106 may permit the logic circuits to receive and transmit data externally via radio frequency (RF) signals.

The antenna 108 for the wireless transponder circuit 106 may receive and transmit wireless signals, such as RF signals, produced by the wireless transponder circuit 106. In one embodiment, the media fastener 104 itself comprises the antenna 108. As discussed above, the media fastener 104 may be formed at least in part from an electrically conductive material, such as aluminum or copper. The electrically conductive portions of the media fastener 104 (which are physically coupled to the housing 114 and in turn to the wireless transponder circuit 106) may further serve as the antenna 108. In other embodiments, the media fastener 104 may comprise a portion of the antenna 108, while in still other embodiments, the antenna and media fastener may be completely separate components.

In the illustrated embodiment, the media fastener 104, and therefore the antenna 108, includes an exposed electrically conductive surface. Thus, as illustrated in FIG. 2, when no media is fastened by the media fastener 104, the antenna 108 may have a first effective length. That first effective length is shown generally by the loop 116. However, when the media 102 is fastened by the media fastener 104, the antenna 108 may have a second effective length. That second effective length is shown generally by the loop 118 of FIG. 2 and corresponds to a length of the antenna 108/media fastener 104 running from one side of the wireless transponder circuit 106 to the other side of the wireless transponder circuit 106. As illustrated, the second, longer effective length is different than the first effective length.

In the illustrated embodiment, the antenna 108 may have first and second effective lengths due to an electrical connection formed between the media engagement portions 110, 112 of the media fastener 104. However, in other embodiments, the effective length of the antenna 108 may change due to other mechanisms. For example, in one embodiment, when media is fastened by the media fastener, a mechanical switch may be triggered by elastic deformation of the media fastener, and the antenna may switch from a first length of wire to a second length of wire. The first length of wire may be shorter than or longer than the second length of wire. Other embodiments are discussed in further detail below.

The second effective length may be approximately equal to a wavelength at which the wireless transponder circuit 106 operates. For example, if the wireless transponder circuit 106 is a passive RFID circuit operating at 2.4 GHz, then its wavelength of operation is approximately 15 cm. Thus, the second effective length of the antenna 108 may be chosen to be approximately 15 cm. In another embodiment, the second effective length may be greater than or equal to one half the wavelength at which the wireless transponder circuit 106 operates: 7.5 cm, in this example. The wireless transponder circuit 106 and its antenna 108 may generally perform well when the effective length of the antenna is between ½ to 1½ times the wavelength of its operative frequency. This may give the media marking transponder system 100 its greatest range of operation. In still other embodiments, an optimal ratio between the effective length of the antenna and the wavelength of its operative frequency may depend on characteristics of the wireless transponder circuit 106, including its impedance.

In contrast, the first effective length may be less than one quarter of the second effective length. Continuing the above example, if the second effective length is approximately 15 cm, the second effective length may be chosen to be less than approximately 3.75 cm. At these smaller effective lengths, the wireless transponder circuit 106 and its antenna 108 may be only marginally operative. For example, although the wireless transponder circuit 106 with the antenna 108 at the first effective length may be capable of communicating with a wireless interrogator 101 located a centimeter away, the wireless transponder circuit 106 may not be able to interact with wireless interrogators at more typical distances and may thereby be rendered functionally inoperable. In another embodiment, the first effective length of the antenna 108 may be approximately zero, and the wireless transponder circuit 106 may be incapable of communicating with a wireless interrogator.

The antenna 108 may be coupled to the wireless transponder circuit 106, as illustrated, via at least two antenna terminals 120, 122. The wireless transponder circuit 106 may include integrated circuitry defining these two antenna terminals 120, 122, and these terminals 120, 122 may be exposed through the housing 114. The antenna 108 may be affixed thereto by any process, including welding, soldering, integrated manufacturing processes, etc.

Figure 3:
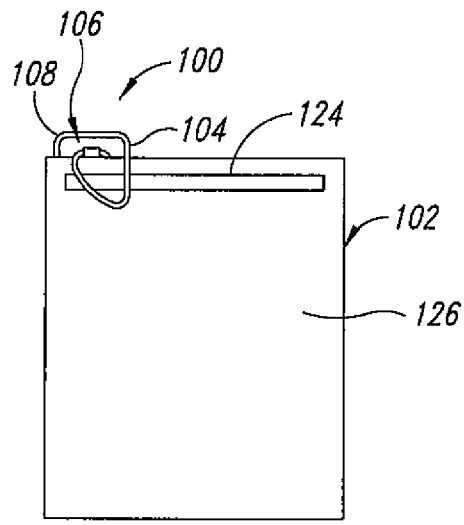
FIG. 3 is a top view of the media marking transponder system of FIG. 1, the media marking transponder system further including an antenna extension element carried by the at least one piece of media, according to another illustrated embodiment.

With reference to FIG. 3, the media marking transponder system 100 of FIG. 1 may further include an antenna extension element 124 carried by a top sheet 126 of the media 102. The antenna extension element 124 may be positioned to electrically contact the antenna 108 to increase an effective length of the antenna 108. This, in turn, may increase an operative range of the media marking transponder system 100.

In one embodiment, the antenna extension element 124 is a thin conductive strip, formed from metal or a non-metallic conductor, which is adhesively coupled to the top sheet 126. In other embodiments, the antenna extension element 124 may comprise electrically conductive ink printed or otherwise deposited on the top sheet 126. In such an embodiment, the media marking transponder system 100 may include a printer (not shown) for printing using such electrically conductive ink. An example method and printer for printing using conductive ink is disclosed in commonly assigned U.S. Ser. No. 09/082,427, filed May 20, 1998, entitled "METHOD AND APPARATUS FOR MAKING ELECTRICAL TRACES, CIRCUITS AND DEVICES," which is hereby incorporated by reference in its entirety. Other electrically conductive materials may be carried by the media 102 in a variety of ways to form antenna extension elements.

As illustrated, the antenna extension element 124 may further increase an effective length of the antenna 108, which had already been increased when the media engagement portions 110, 112 were separated. In other embodiments, the antenna may have an increased effective length only when in contact with the antenna extension element 124. In such embodiments, the antenna, when coupled to media lacking an antenna extension element, may not have an increased effective length. However, when coupled to media carrying an antenna extension element, the effective length of the antenna may increase, such that its effective length when coupled to the media is at least four times greater than its effective length when not coupled to any media.

Figure 4:
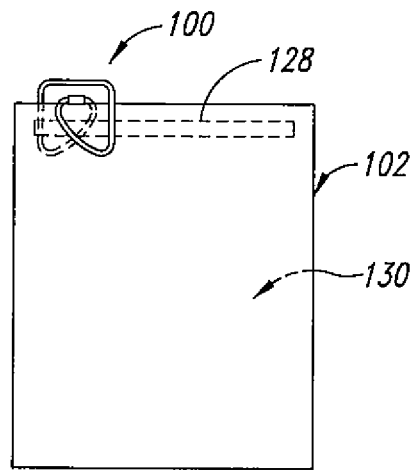
FIG. 4 is a top view of the media marking transponder system of FIG. 1, the media marking transponder system further including an alternative antenna extension element carried by the at least one piece of media, according to another illustrated embodiment.

With reference to FIG. 4, the media marking transponder system 100 of FIG. 1 may further include another antenna extension element 128 carried by a last sheet 130 of the media 102. As illustrated, the antenna extension element 128 may be carried on a reverse side of the last sheet 130 and may contact the media engagement portion 112 of the media fastener 104. The antenna extension element 128 may be formed in a variety of ways, including those discussed above with reference to the antenna extension element 124.

The antenna extension elements 124, 128 may be used in separate embodiments, or may be used as complementary elements in the same implementation. For example, the front page of a document may carry the antenna extension element 124, and the back page of the document may carry the antenna extension element 128.

Figure 5:
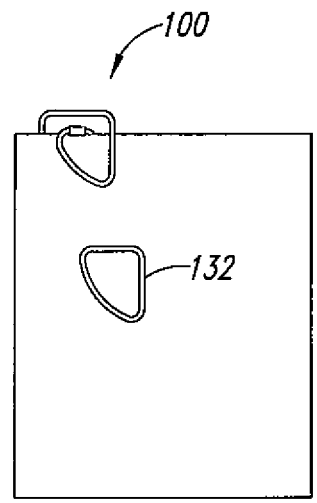
FIG. 5 is a top view of the media marking transponder system of FIG. 1, the media marking transponder system further including a reflector antenna element carried by the at least one piece of media, according to another illustrated embodiment.

Turning to FIG. 5, the media marking transponder system 100 may further include a reflector antenna element 132 carried by the media 102. The reflector antenna element 132 may be positioned on any page of the media 102 in order to inductively interact with the antenna 108 to increase gain in at least one direction.

In one embodiment, the reflector antenna element 132 may be electrically isolated from the antenna 108 and the wireless transponder circuit 106. The reflector antenna element 132 may comprise any electrically conductive material (for example, aluminum or copper), and may be formed by, for example, printing with magnetic ink on the media 102. In one embodiment, the reflector antenna element 132 may be disposed within the media 102. For example, the reflector antenna element 132 may be electrically conductive ink or particles infused within paper comprising the media or may be an electrically conductive component located within a CD case or folder comprising the media. The reflector antenna element 132 is illustrated as having a generally triangular shape, substantially mirroring a portion of the antenna 108. However, other shapes and orientations are possible.

The reflector antenna element 132 may parasitically couple with the antenna 108 during operation, providing gain to signals received and/or transmitted by the antenna 108. The distance between the reflector antenna element 132 and the antenna 108 may be varied to increase and decrease the gain. In one embodiment, the distance may be chosen to approximate one quarter of an operative wavelength of the wireless transponder circuit 106. Depending upon the orientation and shape of the reflector antenna element 132, the reflector antenna element 132 may further increase the gain of the antenna 108 in a particular direction or directions (e.g., in either direction along a particular axis).

Figure 6:
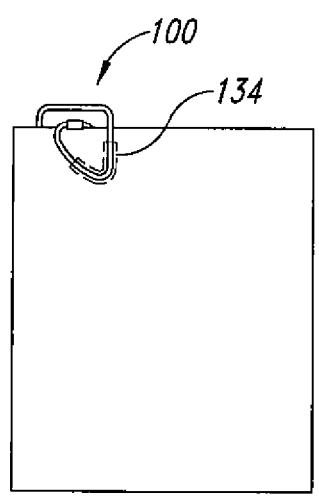
FIG. 6 is a top view of the media marking transponder system of FIG. 1, the media marking transponder system further including an alternative reflector antenna element carried by the at least one piece of media, according to another illustrated embodiment.

Turning to FIG. 6, the media marking transponder system 100 may include an alternative reflector antenna element 134 carried by the media 102. In one embodiment, the reflector antenna element 134 may be electrically isolated from the antenna 108. For example, it may be carried on a page or a side of a page that is not contacted by the antenna 108. That is, if the media 102 includes three pages, the reflector antenna element 134 may be formed on the middle page, on the back side of the front page, or on the front side of the back page.

The reflector antenna element 134 may comprise any electrically conductive material and may be formed, in one embodiment, by printing with magnetic ink on the media 102. The reflector antenna element 134 may also generally form an outline about a portion of the antenna 108 when the media fastener 104 is fastened to the media 102.

Description of Another Exemplary Media Marking Transponder System

Figure 7:
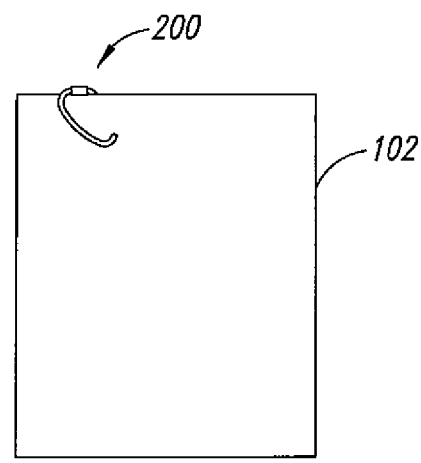
FIG. 7 is a top view of an alternative media marking transponder system, including a media fastener fastened to at least one piece of media, according to one illustrated embodiment.
Figure 8:
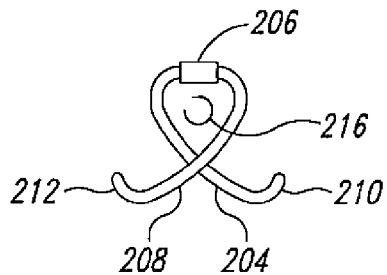
FIG. 8 is a top view of the media marking transponder system of FIG. 7, the media fastener not fastened to any media.

Turning to FIGS. 7 and 8, another media marking transponder system 200 is illustrated. In one embodiment, the media marking transponder system 200 may be configured similarly to the media marking transponder system 100 and may include a media fastener 204, a wireless transponder circuit 206 physically coupled to the media fastener 204, and an antenna 208 for the wireless transponder circuit 206.

The media fastener 204 may be shaped and constructed similarly to a paperclip. In one embodiment, the media fastener 204 is formed from a metal, or a conducting non-metal, which is capable of being elastically deformed. As illustrated, a conductive surface of the media fastener 204 may be exposed, such that when portions of the media fastener 204 contact one another, an electrical connection may be formed.

The media fastener 204 may further comprise a first media engagement portion 210 and a second media engagement portion 212 between which the media 102 is selectively fastenable. In a relaxed configuration, with no media fastened between the media engagement portions 210, 212, as illustrated in FIG. 8, the media engagement portions 210, 212 are in physical and electrical contact with one another. However, when the media engagement portions 210, 212 are elastically deformed, for example, in order to resiliently fasten the media 102, as illustrated in FIG. 7, the media engagement portions 210, 212 are electrically insulated from each other by the media 102.

The wireless transponder circuit 206 may be configured similarly to the wireless transponder circuit 106 described above with reference to FIGS. 1 and 2.

In the illustrated embodiment, the media fastener 204 comprises the antenna 208. The media fastener 204 may be completely conductive, and therefore the entire length of the media fastener 204 may serve as the antenna 208.

In a manner similar to that described above with reference to FIGS. 1 and 2, when no media is fastened by the media fastener 204, the antenna 208 may have a first effective length. That first effective length is shown generally by the loop 216 in FIG. 8. However, when the media 102 is fastened by the media fastener 204, the antenna 208 may have a second effective length. That second effective length may correspond generally to the lengths of the antenna 208 extending from both sides of the wireless transponder circuit 206. As illustrated, the second effective length is different than, and more specifically longer than, the first effective length.

Figure 9:
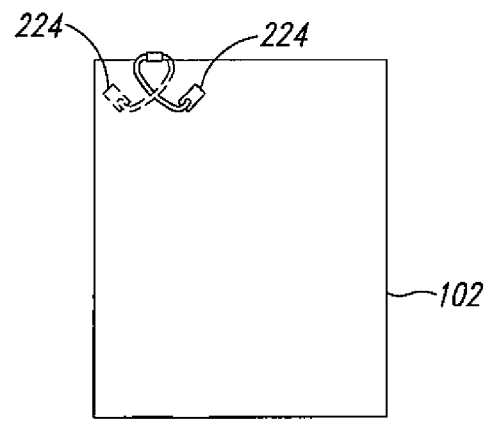
FIG. 9 is a top view of the media marking transponder system of FIG. 7, the media marking transponder system further including a plurality of antenna extension elements carried by the at least one piece of media, according to another illustrated embodiment.

With reference to FIG. 9, the media marking transponder system 200 may further include at least one antenna extension element 224 carried by the media 102. As illustrated, one antenna extension element 224 may be carried on a front side of the media 102, and another antenna extension element 224 may be carried on a back side of the media 102. Each antenna extension element 224 may be positioned to electrically contact the antenna 208 to increase its effective length. This, in turn, may increase an operative range of the media marking transponder system 200.

In one embodiment, the antenna extension elements 224 are thin conductive strips, formed from metal or a non-metallic conductor, which are adhesively coupled to the media 102. In other embodiments, the antenna extension elements 224 may comprise electrically conductive ink printed on the media 102.

As illustrated, the antenna extension elements 224 may further increase an effective length of the antenna 208, which has already been increased by virtue of the insulative effect of the media 102.

In other embodiments, the antenna may have an increased effective length only when in contact with the antenna extension elements 224. In such embodiments, the antenna, when coupled to media lacking an antenna extension element, may not have an increased effective length. However, when coupled to media carrying an antenna extension element, the effective length of the antenna may increase to is at least four times greater than its effective length when not coupled to the media. For example, in one embodiment, a media fastener may be insulated at a contact point between two media engagement portions, but may lack insulation where the media fastener may contact antenna extension elements. Thus, the effective length of an antenna of the wireless transponder circuit may be increased from the length of the media fastener itself to the length of the media fastener plus the lengths of the antenna extension elements, when the media fastener is fastened to media.

Figure 10:
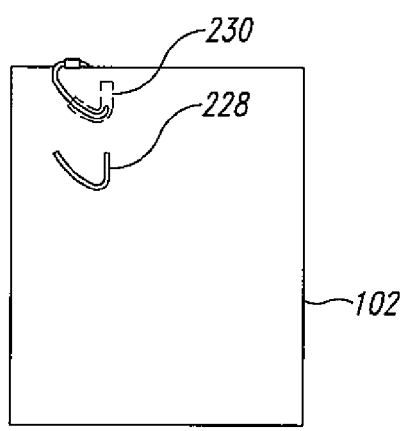
FIG. 10 is a top view of the media marking transponder system of FIG. 7, the media marking transponder system further including a plurality of reflector antenna elements carried by the at least one piece of media, according to another illustrated embodiment.
Figure 11:
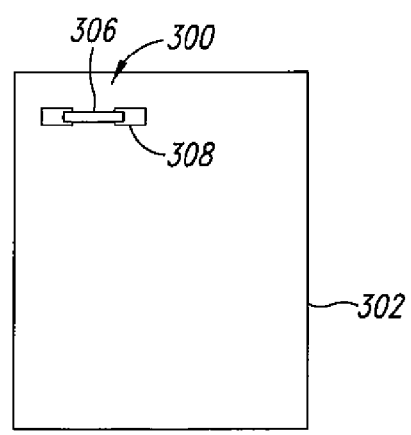
FIG. 11 is a top view of another alternative media marking transponder system, including a media fastener fastened to at least one piece of media, according to one illustrated embodiment.
Figure 12A:
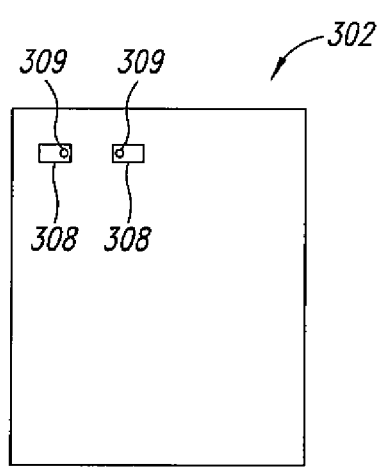
FIG. 12A is a top view of the at least one piece of media of FIG. 11 not fastened to the media fastener.
Figure 12B:
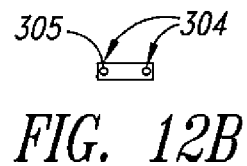
FIG. 12B is a bottom view of the media marking transponder system of FIG. 11.
Figure 12C:
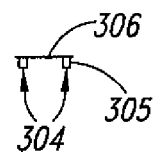
FIG. 12C is a side view of the media marking transponder system of FIG. 11.

Turning to FIG. 10, the media marking transponder system 200 may further include reflector antenna elements 228, 230 carried by the media 102. Both of the reflector antenna elements 228, 230 may be positioned on any page of the media 102 in order to inductively interact with the antenna 208 to increase gain in at least one direction.

In one embodiment, the reflector antenna element 228 may be electrically isolated from the antenna 208 and the wireless transponder circuit 206. The reflector antenna element 228 may comprise any electrically conductive material (for example, aluminum or copper), and may be formed by, for example, printing with magnetic ink on the media 102. The reflector antenna element 228 is illustrated as having a generally checkmark shape, substantially mirroring a portion of the antenna 108. However, other shapes and orientations are also possible.

The reflector antenna element 230 may be similarly electrically isolated from the antenna 208. In one embodiment, the reflector antenna element 230 may be carried on a page or a side of a page that is not contacted by the antenna 208.

The reflector antenna element 230 may also comprise any electrically conductive material and may be formed by printing with magnetic ink on the media 102. In one embodiment, the reflector antenna element 230 may generally form an outline about a portion of the antenna 208 when the media fastener 204 is fastened to the media 102.

In some embodiments, only one or neither of the reflector antenna elements 228, 230 may be used to increase an effective length of the antenna 208.

Description of Another Exemplary Media Marking Transponder System

Turning to FIGS. 11 and 12A-C, yet another media marking transponder system 300 is illustrated. In one embodiment, the media marking transponder system 300 may include a media fastener 304, a wireless transponder circuit 306 physically coupled to the media fastener 304, and an antenna 308 for the wireless transponder circuit 306.

The media fastener 304 may comprise at least one elongate element 305 (most easily seen in the side view of FIG. 12C) that interacts with a corresponding receiving element 309 carried by the media 302 in order to fasten the media marking transponder system 300 to the media 302. For example, in one embodiment, the media fastener 304 may comprise one or more tabs that are configured to be received within one or more tab holes in the media 302. In another embodiment, the media fastener 304 may comprise a plurality of sharp extensions (similar to a thumb tack, for example) that can penetrate and engage the piece of media 302 via frictional forces.

In one embodiment, at least a portion of the media fastener 304 may be formed from a metal, or a conducting non-metal, such that when the media fastener 304 engages the media 302, an electrical connection may be formed between the media fastener 304 and the antenna 308 carried by the media 302. The media fastener 304 may further be electrically coupled to antenna terminals of the wireless transponder circuit 306 such that, when the media fastener 304 engages the media 302, the antenna terminals of the wireless transponder circuit 306 electrically contact the antenna 308.

The wireless transponder circuit 306 may be configured similarly to the wireless transponder circuit 106 described above with reference to FIGS. 1 and 2.

In the illustrated embodiment, the antenna 308 may comprise at least one conductive element carried by the media 302. The antenna 308 may be located adjacent to or include therein the receiving element 309 (as discussed above) and may be formed in a variety of ways. In one embodiment, the antenna 308 includes thin conductive strips, formed from metal or a non-metallic conductor, which are adhesively coupled to the media 302. In other embodiments, the antenna 308 may comprise electrically conductive ink printed on the media 302.

As illustrated, when no media is fastened by the media fastener 304, the wireless transponder circuit 306 lacks an antenna element. Thus, the first effective length of the antenna in this uncoupled configuration is approximately zero. In another embodiment, the media fastener 304 may function as an antenna element even when not coupled to the antenna 308, but the effective length of the media fastener 304 is so small that it approaches zero.

When the media 302 is fastened by the media fastener 304, antenna terminals of the wireless transponder circuit 306 may be coupled to the antenna 308, which has a second effective length. That second effective length may correspond generally to the length of the antenna 308 carried by the media 302. The second effective length is therefore longer than the first effective length.

Description of Another Exemplary Media Marking Transponder System

Figure 13:
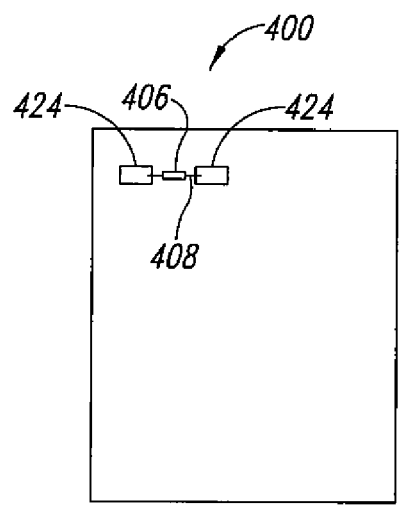
FIG. 13 is a top view of yet another media marking transponder system, including a media fastener fastened to at least one piece of media, according to one illustrated embodiment.
Figures 14A, 14B:
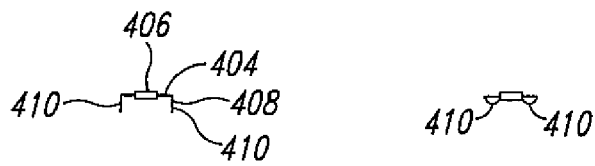
FIG. 14A is a side view of the media marking transponder system of FIG. 13, the media fastener not fastened to any media.
FIG. 14B is a side view of the media marking transponder system of FIG. 13 in a fastened configuration without illustration of any media.

Turning to FIGS. 13 and 14A-B, another media marking transponder system 400 is illustrated. In one embodiment, the media marking transponder system 400 may include a media fastener 404, a wireless transponder circuit 406 physically coupled to the media fastener 404, and an antenna 408 for the wireless transponder circuit 406.

The media fastener 404 in this embodiment may be configured much like a staple. For example, in an uncoupled configuration (FIG. 14A), the media fastener 404 may include vertically extending prongs 410 for engaging the media 402. In a coupled configuration, as shown in FIG. 14B (with the media 402 not illustrated for clarity), those vertically extending prongs 410 may be bent against a back side of the media 402.

The wireless transponder circuit 406 may be configured similarly to the wireless transponder circuit 106 described above with reference to FIGS. 1 and 2.

In the illustrated embodiment, the media fastener 404 comprises the antenna 408. The media fastener 404 may be completely conductive, and therefore the entire length of the media fastener 404 may serve as the antenna 408. Other configurations are, of course, possible.

When no media is fastened by the media fastener 404, the antenna 408 may have a first effective length. That first effective length may be generally defined by the length of the antenna 408, as shown in FIG. 14A. However, when the media 402 is fastened by the media fastener 404, the antenna 408 may have a second effective length. That second effective length may correspond generally to the length of the antenna 408 itself and the lengths of the two antenna extension elements 424 carried by the media 402. As illustrated, the second effective length is longer than the first effective length.

In one embodiment, the antenna extension elements 424 are thin conductive strips, formed from metal or a non-metallic conductor, which are adhesively coupled to the media 402. In other embodiments, the antenna extension elements 424 may comprise electrically conductive ink printed on the media 402.

Figure 15:
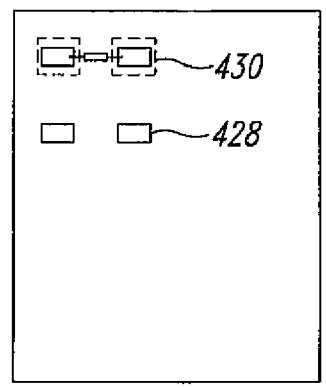
FIG. 15 is a top view of the media marking transponder system of FIG. 13, the media marking transponder system further including a plurality of reflector antenna elements carried by the at least one piece of media, according to another illustrated embodiment.

As illustrated in FIG. 15, the media marking transponder system 400 may further include reflector antenna elements 428, 430 carried by the media 402. Both of the reflector antenna elements 428, 430 may be positioned on any page of the media 402 in order to inductively interact with the antenna 408 and the antenna extension elements 424 to increase gain in at least one direction.

In one embodiment, the reflector antenna element 428 may be electrically isolated from the antenna 408, the antenna extension elements 424 and the wireless transponder circuit 406. The reflector antenna element 428 may comprise any electrically conductive material, and may be formed by, for example, printing or otherwise depositing magnetic ink on the media 402. The reflector antenna element 428 is illustrated as a plurality of box shapes, substantially mirroring the antenna extension elements 424. However, other shapes and orientations are also possible.

The reflector antenna element 430 may be similarly electrically isolated from the antenna 408. In one embodiment, the reflector antenna element 430 may be carried on a page or a side of a page that is not contacted by the antenna 408 or the antenna extension elements 424.

The reflector antenna element 430 may also comprise any electrically conductive material and may be formed by printing with magnetic ink on the media 402. In one embodiment, the reflector antenna element 430 may generally form an outline about a portion of the antenna extension elements 424 when the media fastener 404 is fastened to the media 402.

In some embodiments, only one or neither of the reflector antenna elements 428, 430 may be used to increase an effective length of the antenna 408.

Brief Description of Other Possible Media Marking Transponder Systems

Figure 16:
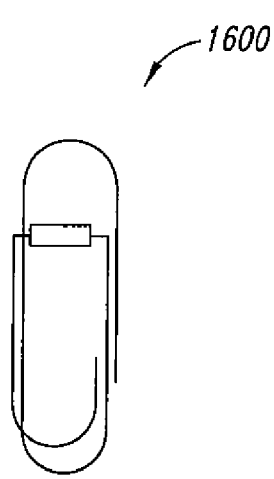
FIG. 16 is a top view of another media marking transponder system, according to another illustrated embodiment.
Figure 17:
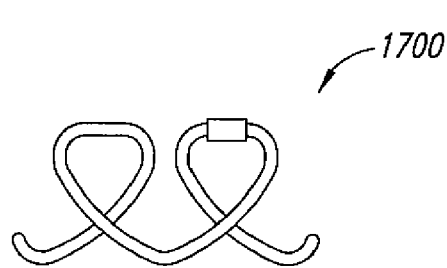
FIG. 17 is a top view of another media marking transponder system, according to another illustrated embodiment.
Figure 18:
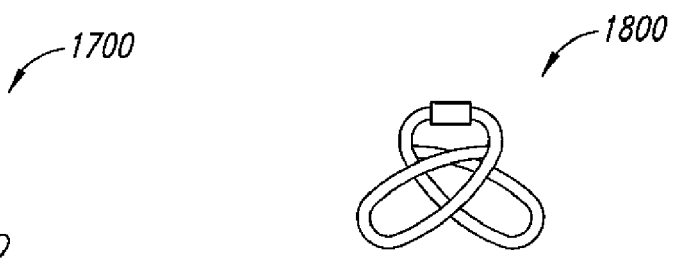
FIG. 18 is a top view of yet another media marking transponder system, according to another illustrated embodiment.

As illustrated in FIGS. 16-18, a variety of different clip shapes and configurations may be used in different embodiments. In many of these embodiments, the media fastener may include at least two portions that are in electrical contact with one another in a relaxed configuration, and which may be electrically insulated from one another by a piece of media when fastened thereto. However, in other embodiments, other media fastener configurations may be used to change an effective length of the antenna when coupled to media.

Description of Another Exemplary Media Marking Transponder System

Figure 19:
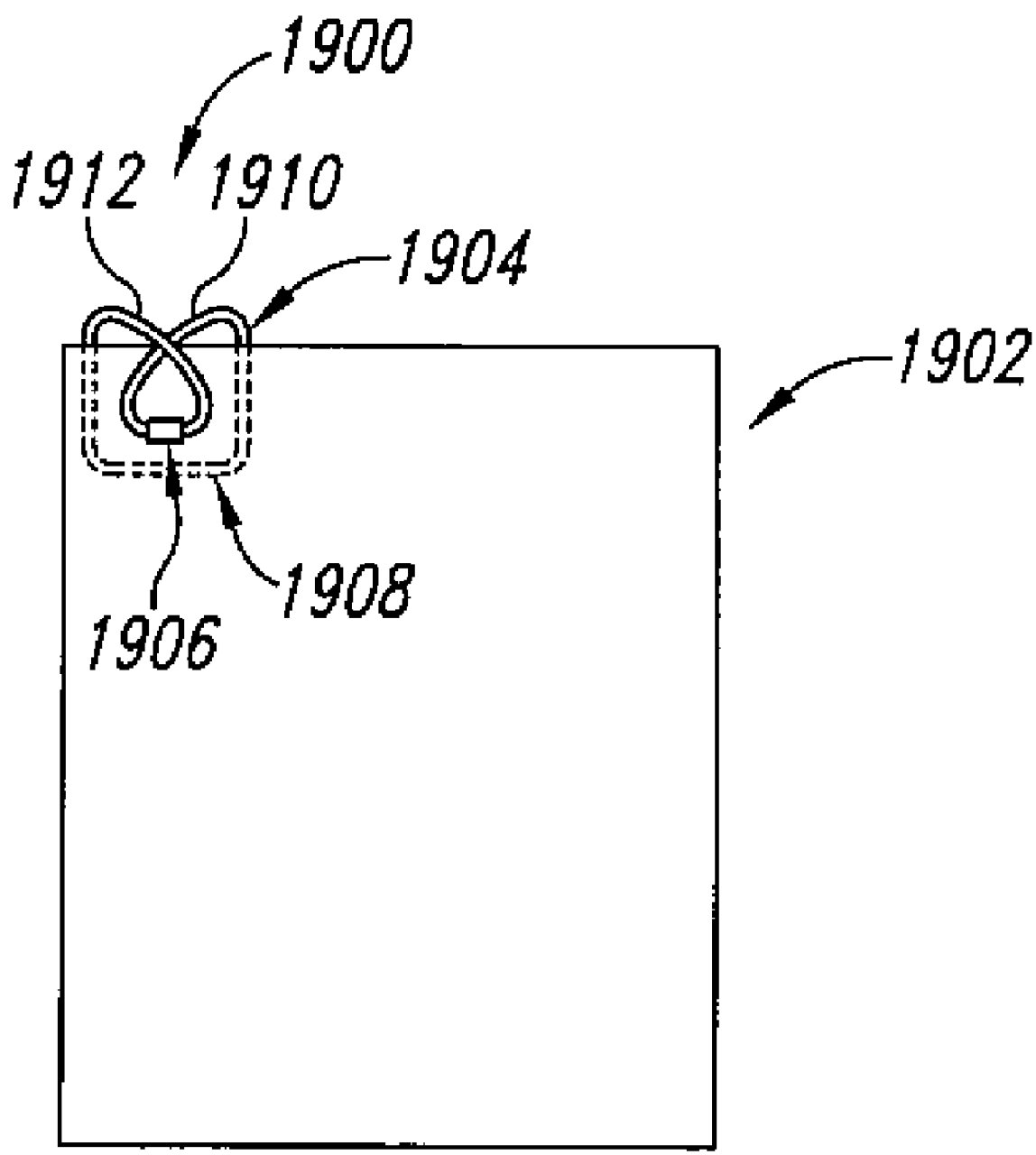
FIG. 19 is a top view of another media marking transponder system, including a media fastener fastened to at least one piece of media, according to one illustrated embodiment.

Turning to FIG. 19, yet another media marking transponder system 1900 is illustrated. In one embodiment, the media marking transponder system 1900 may include a media fastener 1904, a wireless transponder circuit 1906 physically coupled to the media fastener 1904, and an antenna 1908 for the wireless transponder circuit 1906.

The media fastener 1904 in this embodiment may be configured similarly to the media fastener 104 of FIG. 1. However, the arms 1910, 1912 of the media fastener 1904 are separated from one another and not in physical or electrical contact when the media fastener 1904 is in a relaxed state. In a coupled configuration, as shown in FIG. 19, the arms 1910, 1912 (which are both located to one side of the media 1902) may be pushed against each other into physical and electrical contact by the media 1902.

The wireless transponder circuit 1906 may be configured similarly to the wireless transponder circuit 106 described above with reference to FIGS. 1 and 2.

In the illustrated embodiment, the media fastener 1904 comprises the antenna 1908. The media fastener 1904 may be completely conductive, and therefore the entire length of the media fastener 1904 may serve as the antenna 1908. Other configurations are, of course, possible.

When no media is fastened by the media fastener 1904, the antenna 1908 may have a first effective length generally defined by the length of the antenna 1908 (since there is no electrical contact between the arms 1910, 1912). However, when the media 1902 is fastened by the media fastener 1904, the antenna 1908 may have a second effective length due to an electrical contact formed between the arms 1910, 1912 when the media 1902 pushes the arm 1910 towards the arm 1912. That second effective length may correspond generally to the loop illustrated as 116 in FIG. 2. Thus, in one embodiment, the second effective length is shorter than the first effective length. For example, the first effective length may be approximately equal to 2 times the wavelength of the media marking transponder system's operative frequency, while the second effective length may be approximately equal to the wavelength of the operative frequency. In some embodiments, the wireless transponder circuit 1906 may operate more effectively with the antenna 1908 having a shorter effective length (e.g., due to impedance behavior).

Description of an Exemplary Method for Wirelessly Marking Media

Figure 20:
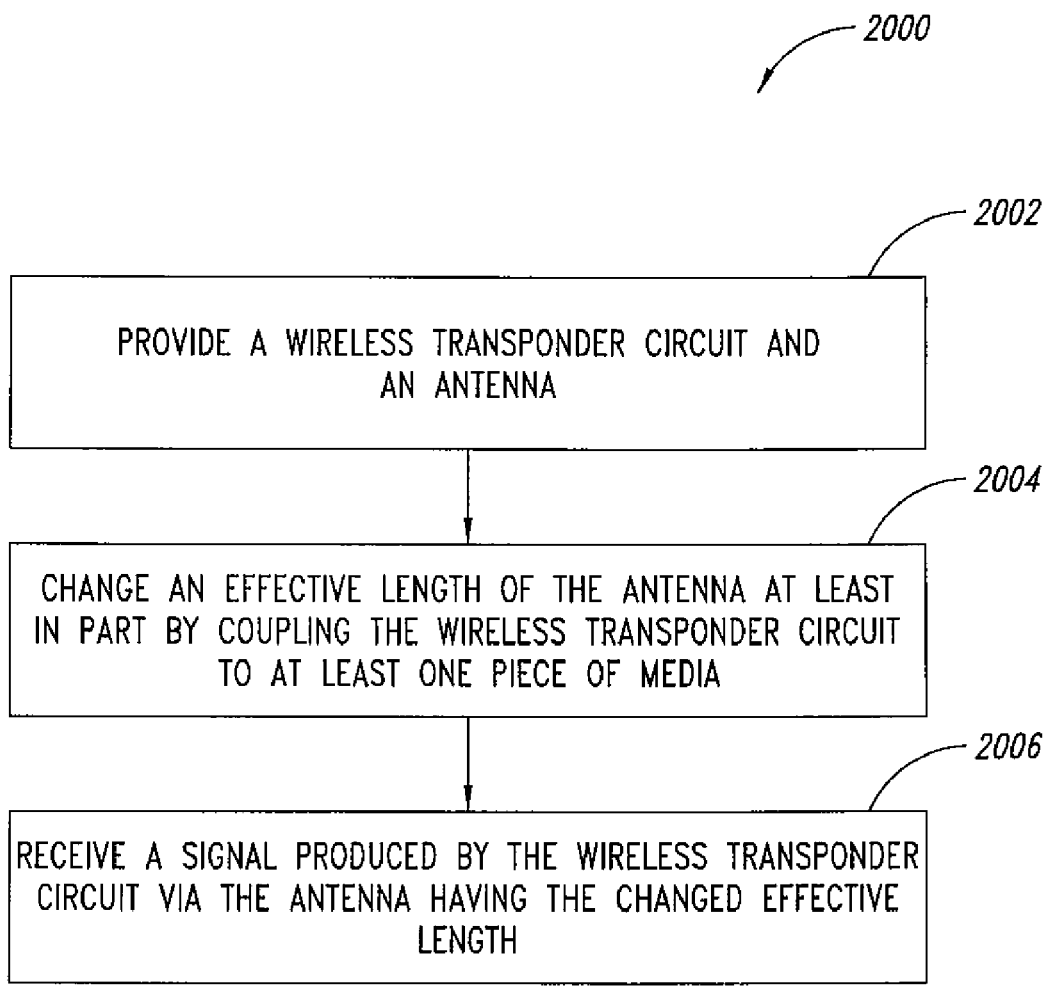
FIG. 20 is a flow diagram illustrating a method of wirelessly marking media according to one illustrated embodiment.

FIG. 20 illustrates a flow diagram for a method 2000 of wirelessly marking media, according to one embodiment. This method 2000 will be discussed in the context of the media marking system 100. However, it may be understood that the acts disclosed herein may also be executed using a variety of media marking systems, including any of those discussed above, in accordance with the described method.

The method begins at 2002, when a wireless transponder circuit 106 and an antenna 108 for the wireless transponder circuit 106 are provided. As discussed above, the wireless transponder circuit 106 and antenna 108 may be provided as a structural unit. In other embodiments, such as that shown in FIGS. 12A-12C, the wireless transponder circuit may be provided separately from at least a portion of the antenna, which may be formed on a piece of media.

At 2004, an effective length of the antenna 108 is changed at least in part by coupling the wireless transponder circuit 106 to at least one piece of media 102. In one embodiment, the wireless transponder circuit 106 is physically coupled to a media fastener 104, and the media fastener 104 in turn may be fastened to the media 102, thereby coupling the wireless transponder circuit 106 to the media 102. The media fastener 104 may be fastened to the media 102 in a variety of ways, including stapling, clipping, frictional engagement, resilient engagement, etc. In other embodiments, other methods may be used to couple the wireless transponder circuit 106 to the media 102. For example, in one embodiment, the media 102 itself may include a receptacle for receiving and engaging the wireless transponder circuit 106.

As discussed in greater detail above, an effective length of the antenna 108 may be changed once the wireless transponder circuit 106 is coupled to the media 102. For example, in one embodiment, the antenna 108 and the media fastener 104 may comprise the same physical elements, and the antenna 108 may have a shorter effective length (e.g., due to shorting across exposed electrically conductive portions of the antenna 108) when the media fastener 104 is not coupled to any media. In other embodiments, the media 102 may include conductive elements that may comprise portions of the antenna 108 when the wireless transponder circuit 106 is coupled to the media 102.

In the coupled configuration, the wireless transponder circuit 106 may, in one embodiment, store information representative of the media 102. For example, in one embodiment, the wireless transponder circuit 106 may have associated therewith a unique identifier. Once coupled to the media 102, a computing system (not shown) may associate the unique identifier of the wireless transponder circuit 106 with the media 102 in order to more easily find the media 102 in the future. In another embodiment, other information representative of the media 102 may be stored in a memory of the wireless transponder circuit 106. For example, the memory may store metadata regarding the media 102 (e.g., document title, author, date created, date modified), and this metadata may be transmitted to the wireless interrogator 101 in response to a wireless interrogation signal. Other ways of using the media marking transponder system 100 to monitor and track media may also be implemented.

At 2006, a signal produced by the wireless transponder circuit 106 is received via the antenna 108 having the changed effective length. In one embodiment, the wireless transponder circuit 106 may first be energized (in a passive system) by an external, wireless interrogation signal produced by the wireless interrogator 101 in a frequency range in which the wireless transponder circuit 106 operates. The wireless interrogator 101 may, for example, induce a current through the antenna 108, which may provide power to the circuitry of the wireless transponder circuit 106. The wireless transponder circuit 106 may then produce a signal in response to the wireless interrogation signal, which may be sent via the antenna 108 and received at the wireless interrogator 101. Other methods of sending and receiving signals using the media marking transponder system may also be used.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

We claim:

1. A media marking transponder system, comprising:
   a media fastener;
   a wireless transponder circuit coupled to the media fastener; and
   an antenna for the wireless transponder circuit, the antenna having a first effective length when no piece of media is fastened to the media fastener and a second effective length when at least one piece of media is fastened to the media fastener, the second effective length different than the first effective length.

2. The system of claim 1, wherein the wireless transponder circuit is a read/write passive radio frequency identification circuit having a memory.

3. The system of claim 1, wherein the wireless transponder circuit is an integrated circuit having at least two antenna terminals, the antenna terminals coupled to the media fastener.

4. The system of claim 3, wherein the media fastener comprises at least a portion of the antenna.

5. The system of claim 1, wherein the media fastener has at least two media engagement portions between which the at least one piece of media is selectively fastenable, the at least two media engagement portions are coupled to the wireless transponder circuit as the antenna, and the antenna has the first effective length when no piece of media is fastened between the at least two media engagement portions and the second effective length when the at least one piece of media is fastened between the at least two media engagement portions.

6. The system of claim 1, wherein the media fastener is a clip having at least two media engagement portions that are elastically deformable to fasten the at least one piece of media therebetween, and wherein the at least two media engagement portions are in electrical contact with one another when no piece of media is fastened between the at least two media engagement portions and the at least two media engagement portions are electrically insulated from each other by the at least one piece of media when the at least one piece of media is fastened between the at least two media engagement portions.

7. The system of claim 1, further comprising:
   a reflector antenna element carried by the at least one piece of media and positioned to inductively interact with the antenna to increase gain in at least one direction when the at least one piece of media is fastened to the media fastener.

8. The system of claim 7, wherein the reflector antenna element is an electrically conductive material printed on a reverse side of the at least one piece of media from a side that physically contacts the antenna.

9. The system of claim 7, wherein the reflector antenna element is an electrically conductive material printed on a side of the at least one piece of media that physically contacts the antenna.

10. The system of claim 1, further comprising:
at least one antenna extension element carried by the at least one piece of media and positioned to electrically contact the antenna to increase an effective length of the antenna.

11. The system of claim 1, wherein the antenna is carried by the at least one piece of media and positioned on the at least one piece of media to electrically contact at least one antenna terminal of the wireless transponder circuit when the at least one piece of media is fastened to the media fastener.

12. The system of claim 11, wherein the antenna is an electrically conductive ink printed on the at least one piece of media.

13. The system of claim 11, further comprising:
a reflector antenna element carried by the at least one piece of media and positioned on the at least one piece of media to inductively interact with the antenna to increase gain in at least one direction.

14. The system of claim 13, wherein the reflector antenna element is an electrically conductive ink printed on a reverse side of the at least one piece of media from a side that carries the antenna.

15. The system of claim 13, wherein the reflector antenna element is an electrically conductive ink printed on a side of the at least one piece of media that carries the antenna.

16. The system of claim 13, wherein the reflector antenna element is an electrically conductive material disposed within the at least one piece of media.

17. The system of claim 1, wherein the second effective length is approximately equal to a wavelength at which the wireless transponder circuit operates.

18. The system of claim 1, wherein the second effective length is greater than or equal to one half of a wavelength at which the wireless transponder circuit operates.

19. The system of claim 1, further comprising:
a wireless interrogator configured to emit wireless interrogation signals in a frequency range in which the wireless transponder circuit operates.

20. The system of claim 1, further comprising
a printer configured to print conductive material on the at least one piece of media.

21. The system of claim 1, wherein the second effective length is longer than the first effective length.

22. The system of claim 21, wherein the first effective length is less than one quarter of the second effective length.

23. A media marking transponder system, comprising:
means for fastening to at least one piece of media;
means for responding to a wireless interrogation signal, the means for responding physically coupled to the means for fastening; and
means for wirelessly transmitting a signal produced by the means for responding, the means for wirelessly transmitting having a first effective length when no piece of media is fastened to the means for fastening and a second effective length when at least one piece of media is fastened to the means for fastening, the second effective length different than the first effective length.

24. A method of wirelessly marking media comprising:
providing a wireless transponder circuit and an antenna for the wireless transponder circuit;
changing an effective length of the antenna at least in part by coupling the wireless transponder circuit to at least one piece of media; and
receiving a signal produced by the wireless transponder circuit via the antenna having the changed effective length.

25. The method of claim 24, further comprising:
providing a media fastener coupled to the wireless transponder circuit;
wherein coupling the wireless transponder circuit to the at least one piece of media includes fastening the media fastener to the at least one piece of media.

* * * * *